United States Patent
Kiso et al.

(10) Patent No.: US 12,539,548 B2
(45) Date of Patent: Feb. 3, 2026

(54) GROOVING TOOL

(71) Applicant: MITSUBISHI MATERIALS CORPORATION, Tokyo (JP)

(72) Inventors: Takuma Kiso, Tokyo (JP); Taichi Onoe, Tokyo (JP); Shota Toduka, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 478 days.

(21) Appl. No.: 18/021,188

(22) PCT Filed: Aug. 31, 2021

(86) PCT No.: PCT/JP2021/031900
§ 371 (c)(1),
(2) Date: Feb. 14, 2023

(87) PCT Pub. No.: WO2022/045348
PCT Pub. Date: Mar. 3, 2022

(65) Prior Publication Data
US 2023/0347426 A1  Nov. 2, 2023

(30) Foreign Application Priority Data

Aug. 31, 2020 (JP) ................................ 2020-145526
Aug. 26, 2021 (JP) ................................ 2021-138204

(51) Int. Cl.
*B23B 29/04* (2006.01)
*B22F 10/20* (2021.01)
(Continued)

(52) U.S. Cl.
CPC ................. *B23C 3/28* (2013.01); *B23C 5/20* (2013.01); *B23B 27/04* (2013.01); *B23B 27/10* (2013.01);
(Continued)

(58) Field of Classification Search
CPC ......... B23C 3/28; B23C 5/20; B23B 2205/02; B23B 2220/126; B23B 29/043;
(Continued)

(56) References Cited

U.S. PATENT DOCUMENTS 4,332,513 A * 6/1982 Gowanlock ............. B23B 27/04
407/120
5,156,502 A * 10/1992 Satran ................... B23B 27/045
407/113
(Continued)

FOREIGN PATENT DOCUMENTS

AT         17072 U1 *   4/2021    ............ B23B 29/04
CN      102821895 A   12/2012
(Continued)

OTHER PUBLICATIONS

International Search Report mailed Nov. 22, 2021, issued for PCT/JP2021/031900 and English translation thereof.
(Continued)

*Primary Examiner* — Sara Addisu
(74) *Attorney, Agent, or Firm* — Troutman Pepper Locke LLP

(57) ABSTRACT

This grooving tool includes a cutting insert, a holder, and a coolant flow path. The holder includes an insert mounting seat, and jaw parts that are disposed on an upper side and a lower side of the insert mounting seat and fix the cutting insert. The jaw part forms a curved shape as viewed from a tool distal end side, and has a thickness that is decreased as a distance from the insert mounting seat is increased. The coolant flow path includes a jaw part flow path extending through an inside of the jaw part, and the jaw part flow path includes a guide flow path section that has a vertically elongated shape with a dimension a in the vertical direction larger than a dimension b in the tool width direction in a
(Continued)

channel cross section, and an ejection flow path section that has a laterally elongated shape.

8 Claims, 14 Drawing Sheets

(51) Int. Cl.
  *B23C 3/28* (2006.01)
  *B23C 5/20* (2006.01)
  *B23Q 11/00* (2006.01)
  B23B 27/04 (2006.01)
  B23B 27/10 (2006.01)

(52) U.S. Cl.
  CPC ......... *B23B 29/043* (2013.01); *B23B 2205/02* (2013.01)

(58) Field of Classification Search
  CPC ......... B23B 27/10; B23B 27/04; B23B 27/16; B23B 29/12; B23B 2250/12
  See application file for complete search history.

(56) References Cited

U.S. PATENT DOCUMENTS

| | | | | |
|---|---|---|---|---|
| 5,709,508 | A * | 1/1998 | Barazani | B23B 27/10 407/112 |
| 7,959,384 | B2 * | 6/2011 | Breisch | B23B 29/043 407/113 |
| 8,911,185 | B2 * | 12/2014 | Nagaya | B23B 27/086 407/50 |
| 10,335,862 | B2 * | 7/2019 | Breisch | B23B 29/043 |
| 10,343,222 | B2 * | 7/2019 | Schwagerle | B23B 27/086 |
| 10,486,238 | B2 * | 11/2019 | Sasaki | B23B 27/08 |
| 10,766,075 | B2 * | 9/2020 | Andersson | B23B 29/043 |
| 11,806,792 | B2 * | 11/2023 | Kobayashi | B23B 1/00 |
| 11,897,038 | B2 * | 2/2024 | Hecht | B23B 29/043 |
| 12,179,274 | B2 * | 12/2024 | Luik | B23B 29/043 |
| 2009/0035075 | A1 * | 2/2009 | Hecht | B23B 29/043 407/104 |
| 2010/0239377 | A1 * | 9/2010 | Morrison | B23C 5/28 407/42 |
| 2012/0230780 | A1 * | 9/2012 | Henry | B23B 27/10 407/11 |
| 2015/0132074 | A1 * | 5/2015 | Boissonnet | B23B 27/1625 407/11 |
| 2016/0175938 | A1 * | 6/2016 | Kaufmann | B23B 27/10 407/11 |
| 2016/0339523 | A1 | 11/2016 | Graf et al. | |
| 2016/0339526 | A1 * | 11/2016 | Luik | B23B 27/04 |
| 2018/0085831 | A1 * | 3/2018 | Sasaki | B23B 27/08 |
| 2019/0210115 | A1 * | 7/2019 | Jansson | B23B 29/06 |
| 2019/0366444 | A1 * | 12/2019 | Henzler | B23B 27/10 |
| 2020/0180040 | A1 * | 6/2020 | Andoh | B23B 27/10 |
| 2020/0230710 | A1 | 7/2020 | Hirano et al. | |
| 2021/0394278 | A1 * | 12/2021 | Thabit | B23B 29/046 |
| 2022/0097247 | A1 * | 3/2022 | Hecht | B23B 27/08 |
| 2023/0173586 | A1 * | 6/2023 | Ishai | B23B 27/086 407/11 |
| 2023/0347426 | A1 * | 11/2023 | Kiso | B23B 29/043 |
| 2024/0025072 | A1 * | 1/2024 | Sasaki | B26D 7/088 |
| 2024/0058872 | A1 * | 2/2024 | Hecht | B23B 27/10 |
| 2024/0131599 | A1 * | 4/2024 | Lee | B23B 29/043 |
| 2024/0227032 | A9 * | 7/2024 | Lee | B23B 29/043 |

FOREIGN PATENT DOCUMENTS

| | | | | |
|---|---|---|---|---|
| CN | 105710400 | A | 6/2016 | |
| CN | 109530735 | A | 3/2019 | |
| DE | 202018105949 | U1 | 1/2020 | |
| DE | 102018125767 | A1 | 4/2020 | |
| EP | 3693110 | A1 * | 8/2020 | ............. B23B 27/16 |
| JP | 2015-093380 | A | 5/2015 | |
| JP | 2019-511382 | A | 4/2019 | |
| JP | 2020163526 | A * | 10/2020 | |
| KR | 10-2020-0081780 | A | 7/2020 | |
| WO | 2017/178157 | A1 | 10/2017 | |
| WO | 2018/143089 | A1 | 8/2018 | |
| WO | WO-2018221162 | A1 * | 12/2018 | ............. B23B 27/10 |
| WO | 2019/021605 | A1 | 1/2019 | |

OTHER PUBLICATIONS

Office Action mailed Feb. 28, 2025, issued for CN202180053574.3 and English translation thereof.
Supplementary European Search Report mailed Sep. 5, 2024, issued for EP21861769.4.

* cited by examiner

GROOVING TOOL

TECHNICAL FIELD

The present invention relates to a grooving tool.

Priority is claimed on Japanese Patent Application No. 2020-145526, filed Aug. 31, 2020 and Japanese Patent Application No. 2021-138204, filed Aug. 26, 2021, the contents of which are incorporated herein by reference.

BACKGROUND ART

Grooving tools for performing grooving an end surface or a peripheral surface of a work material are known. The grooving tool includes a cutting insert that has a cutting edge, a holder that holds the cutting insert, and a coolant flow path that extends through the inside of the holder. The holder has an insert mounting seat on which the cutting insert is disposed, and a pair of jaw parts disposed on an upper side and a lower side of the insert mounting seat and contact with the cutting insert from the upper and lower directions. As the grooving tool in the related art, for example, a grooving tool disclosed in Patent Document 1 is well known.

CITATION LIST

Patent Document

[Patent Document 1]
   Japanese Unexamined Patent Application, First Publication No. 2015-93380

SUMMARY OF INVENTION

Technical Problem

For example, a grooving tool for end surface grooving or the like may have jaw parts formed in curved shapes as viewed from a tool distal end side. In this case, the plate thickness of the jaw parts are decreased as the distance from the insert mounting seat is increased in the vertical direction. In such a grooving tool, it is difficult to provide coolant flow paths having desired shapes in the jaw parts.

For example, in a case of supplying coolant to a vicinity of a cutting edge through a flank surface of the cutting insert, it is necessary to incline the coolant flow path in the jaw part with an angle to an upper side toward the tool distal end side such that the vicinity of an ejection port of the coolant flow path has an inclination close to the flank surface. However, there are problems that a cross-sectional area of the coolant flow path should be reduced, and the coolant flow path cannot be sufficiently inclined due to various restrictions due to a small-plate thickness portion or the curved shape of the jaw part That is, in a case of trying to eject the coolant with high accuracy to the vicinity of the cutting edge by passing the coolant flow path through the small-plate thickness portion of the jaw part, the cross-sectional area of the coolant flow path should be reduced, and thus the coolant flow rate is decreased. In addition, in a case of trying to ensure a large cross-sectional area of the coolant flow path by passing the coolant flow path through a large-plate thickness portion of the jaw part, it is difficult to incline the coolant flow path in the vicinity of the ejection port, and the coolant cannot be ejected with high accuracy to the vicinity of the cutting edge.

An object of the present invention is to provide a grooving tool that can eject a coolant with high accuracy to a vicinity of a cutting edge while ensuring a sufficient coolant flow rate.

Solution to Problem

One aspect of the present invention relates to a grooving tool including a cutting insert including a cutting edge, a holder configured to hold the cutting insert, and a coolant flow path extending through an inside of the holder. The cutting edge includes a cutting edge section extending in a tool width direction, and the holder includes an insert mounting seat on which the cutting insert is disposed, and a pair of jaw parts disposed on an upper side and a lower side of the insert mounting seat, and the jaw parts are into contact with the cutting insert from the upper and lower directions. At least one of the jaw parts has a plate shape extending in a direction perpendicular to the tool width direction, extends into a curved shape as viewed from a tool distal end side, and has a plate thickness that is decreased as a distance from the insert mounting seat is increased in the vertical direction. The coolant flow path includes a jaw part flow path extending through an inside of the at least one of the jaw parts. The jaw part flow path includes a guide flow path section that has a channel cross section having a vertically elongated shape with a dimension in the vertical direction larger than a dimension in the tool width direction, and an ejection flow path section that communicates with the guide flow path section. The ejection flow path section is disposed on the tool distal end side with respect to the guide flow path section and on a side closer to the insert mounting seat in the vertical direction, and is open at an end part of the jaw part on the tool distal end side. A channel cross section of the ejection flow path section has a laterally elongated shape with a dimension in the tool width direction larger than a dimension in the vertical direction. It should be noted that, in the present specification, the "cross sections" of the guide flow path section and the ejection flow path section both indicate cross sections appearing on a virtual plane perpendicular to an axial direction of the holder.

With the grooving tool according to the aspect, even in a case in which the jaw parts that clamp the cutting insert have curved plate shapes with a plate thickness that is decreased as a distance from the insert mounting seat is increased in the vertical direction, the coolant can be stably ejected with high accuracy from the jaw part flow path extending through the inside of the jaw part to the vicinity of the cutting edge.

More specifically, since the channel cross section of the ejection flow path section that is open at the end part of the jaw part on the tool distal end side in the jaw part flow path has a laterally elongated shape with the dimension in the tool width direction larger than the dimension in the vertical direction, the ejection flow path section is disposed in the large-plate thickness portion in the jaw part, that is, a portion close to the insert mounting seat, and the coolant can be stably ejected over the entire area from the ejection flow path section to the entire cutting edge including at least the cutting edge section.

In addition, since the channel cross section of the guide flow path section in the jaw part flow path has the vertically elongated shape with the dimension in the vertical direction larger than the dimension in the tool width direction, the guide flow path section can be disposed in the small-plate thickness portion (thin-wall portion) that is distant from the insert mounting seat in the vertical direction in the jaw part. That is, the guide flow path section can be disposed in the thin-wall portion of the jaw part in a state of ensuring a large cross-sectional area of the guide flow path section, that is, a state of ensuring the flow rate of the coolant ejected from the jaw part, it is easy to incline a shape of the flow path from the guide flow path section to the ejection flow path section with an angle inclined to the vertical direction toward the tool distal end side. Therefore, it is easy to dispose the cutting edge in the vicinity of an extension line of an opening portion (ejection port) of the ejection flow path section, and the coolant can be supplied to the vicinity of the cutting edge with high accuracy and high efficiency.

In the grooving tool, the jaw part flow path may be provided in each of the jaw parts.

In this case, the coolant can be ejected from the jaw part flow path of an upper jaw part, of the pair of jaw parts, which is disposed on the upper side of the insert mounting seat to the vicinity of the cutting edge through a rake surface of the cutting insert. In addition, the coolant can be ejected from the jaw part flow path of a lower jaw part, of the pair of jaw parts, which is disposed on the lower side of the insert mounting seat to the vicinity of the cutting edge through the flank surface of the cutting insert. Therefore, it is possible to more stably supply the coolant to the vicinity of the cutting edge.

In the grooving tool, a cross-sectional area of the ejection flow path section may be smaller than a cross-sectional area of the guide flow path section.

In the grooving tool, a cross-sectional area of the guide flow path section and a cross-sectional area of the ejection flow path section may be the same as each other.

For example, unlike the configuration described above, in a case in which the cross-sectional area of the ejection flow path section is larger than the cross-sectional area of the guide flow path section, when the coolant flows from the guide flow path section to the ejection flow path section, a decrease in a flow velocity, a pressure loss, or the like may occur due to an increase in the cross-sectional area.

On the other hand, with any configuration described above, when the coolant flows from the guide flow path section to the ejection flow path section, the decrease in the flow velocity, the pressure loss, or the like is suppressed. The flow velocity of the coolant flowing in the ejection flow path section is stably increased, and the vicinity of the cutting edge can be cooled with high efficiency by the coolant ejected from the ejection flow path section.

In the grooving tool, a maximum value of a ratio (a/b) of a dimension (a) in the vertical direction to a dimension (b) in the tool width direction in the channel cross section of the guide flow path section may be 1.2 or more and 5.0 or less.

In addition, the ratio (a/b) of the guide flow path section may be decreased toward the tool distal end side.

In a case in which the maximum value of the ratio (a/b) of the dimension (a) in the vertical direction to the dimension (b) in the tool width direction in the channel cross section of the guide flow path section is 1.2 or more, the channel cross section of the guide flow path section is stably formed into a vertically elongated shape, and it is easy to dispose the guide flow path section in the thin-wall portion of the jaw part. Therefore, the actions and effects of the present invention described above can be obtained more stably.

In addition, in a case in which the maximum value of the ratio (a/b) is 5.0 or less, it is possible to suppress problems, such as an increase in the pressure loss due to the shape of the channel cross section being too long and flat.

Further, in a case in which the ratio (a/b) of the guide flow path section is decreased toward the tool distal end side, since a change in a cross-sectional shape of the guide flow path section is smooth, a channel resistance of the guide flow path section is suppressed to be small.

In the grooving tool, a maximum value of a ratio (b/a) of a dimension (b) in the tool width direction to a dimension (a) in the vertical direction in the channel cross section of the ejection flow path section may be 1.2 or more and 5.0 or less.

In addition, the ratio (b/a) of the ejection flow path section may be increased toward the tool distal end side.

In a case in which the maximum value of the ratio (b/a) of the dimension (b) in the tool width direction to the dimension (a) in the vertical direction in the channel cross section of the ejection flow path section is 1.2 or more, the channel cross section of the ejection flow path section is stably formed into a laterally elongated shape, and it is easy to eject the coolant stably to the entire area of the cutting edge from the ejection flow path section. Therefore, the actions and effects of the present invention described above can be obtained more stably.

Also, in a case in which the maximum value of the ratio (b/a) is 5.0 or less, it is possible to suppress problems that the coolant is wastefully diffused to a portion other than the cutting edge due to the coolant being ejected in a form of mist due to the shape of the channel cross section being too long and flat.

Further, in a case in which the ratio (b/a) of the ejection flow path section is increased toward the tool distal end side, since a change in a cross-sectional shape of the ejection flow path section is smooth, a channel resistance of the ejection flow path section is suppressed to be small.

In the grooving tool, the channel cross section of each of the guide flow path section and the ejection flow path section may have an elliptical shape.

In the grooving tool, the channel cross section of each of the guide flow path section and the ejection flow path section may have a polygonal shape, such as a triangular shape, a quadrangular shape, a pentagonal shape, or a hexagonal shape.

Advantageous Effects of Invention

With the grooving tool according to the aspects of the present invention, the coolant can be ejected with high accuracy to the vicinity of the cutting edge while ensuring the coolant flow rate.

DESCRIPTION OF EMBODIMENTS

A grooving tool 1 according to one embodiment of the present invention will be described with reference to the drawings. The grooving tool 1 according to the present embodiment is a cutting tool used for turning, such as grooving or cutting-off. The grooving tool 1 is detachably attached to a cutting tool table of a machine tool, such as a lathe (not shown). Specifically, the grooving tool 1 according to the present embodiment is an edge replaceable grooving tool for end surface grooving.

Figure 1:
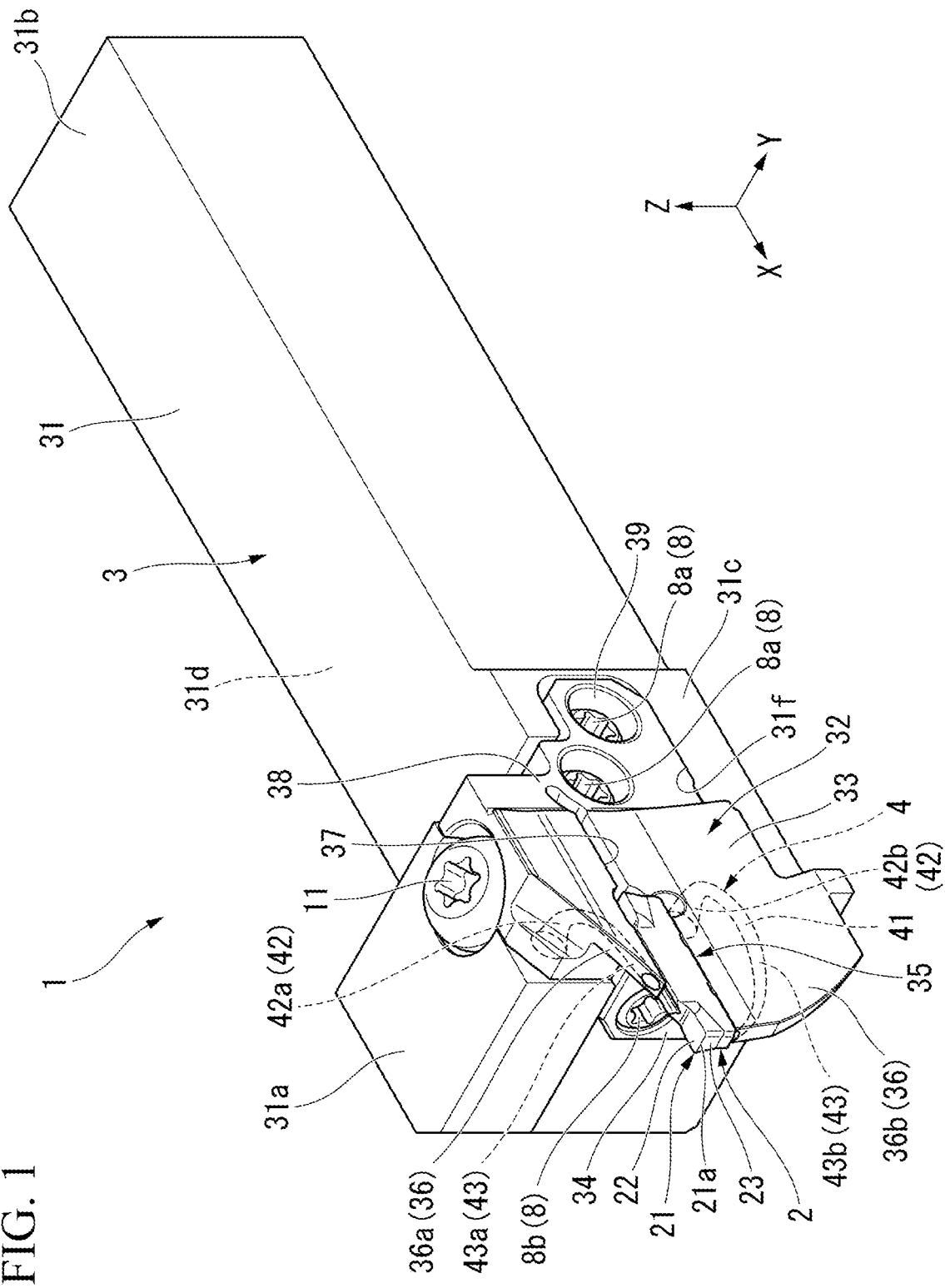
FIG. 1 is a perspective view showing a grooving tool according to one embodiment of the present invention.
Figure 2:
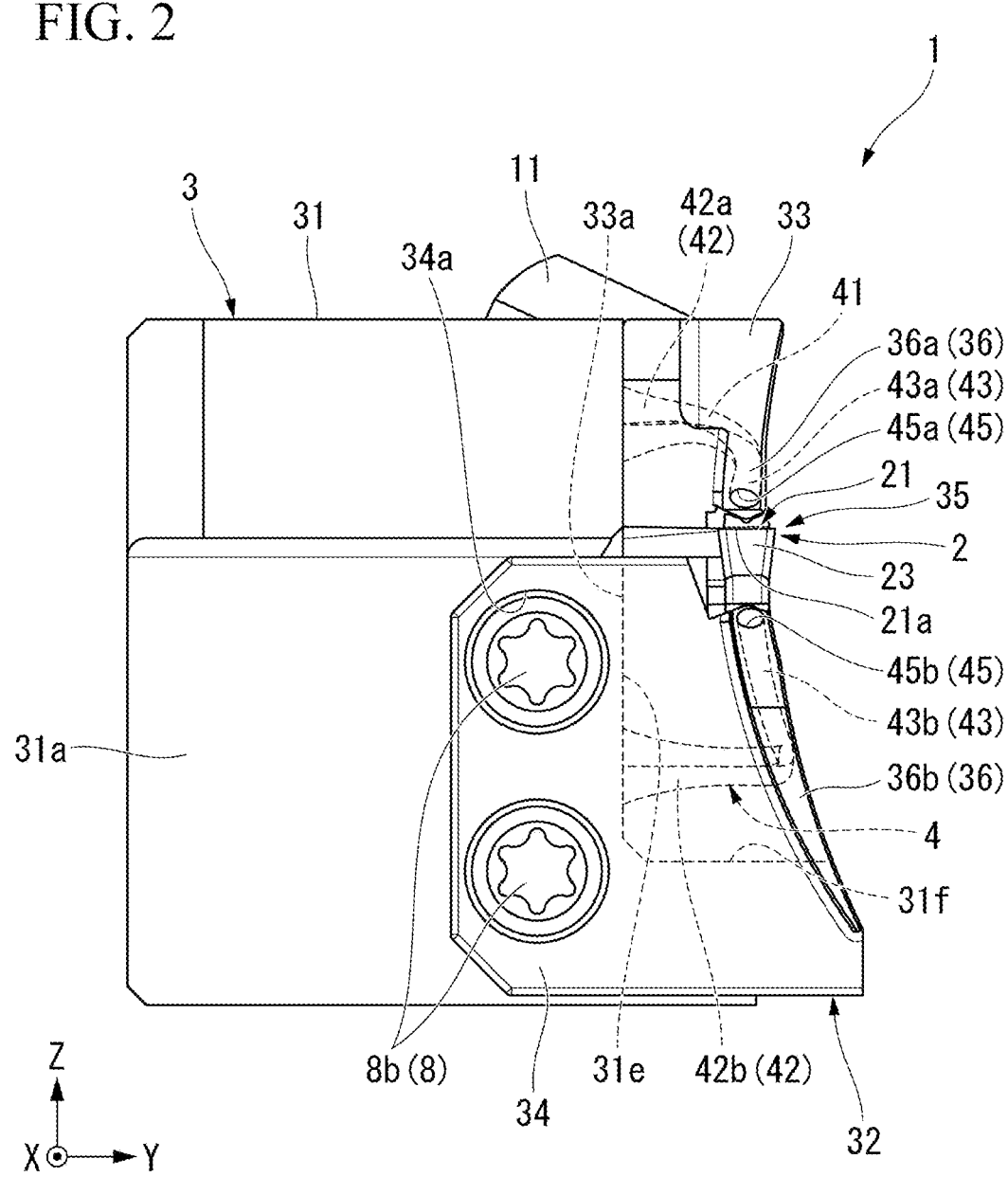
FIG. 2 is a front view of the grooving tool according to the present embodiment as viewed from a tool distal end side of the grooving tool.

As shown in FIGS. 1 and 2, the grooving tool 1 is configured by an elongated rectangular cutting insert 2 including a cutting edge 21 at a distal end thereof, and a holder 3 that holds the cutting insert 2. The holder 3 includes a square bar-shaped shank section 31 mounted to the cutting tool table or the like, a head member 32 that interposes and fixes the cutting insert 2, a coolant flow path 4 that extends through an inside of the holder 3 and supplies a coolant to the cutting edge 21, and a fixing screw 8 and a fastening screw 11 for fixing the head member 32 to the shank section 31. The head member 32 is detachably mounted to a first end part 31a of both end parts (first end part 31a and second end part 31b) of the shank section 31, and the cutting edge 21 protrudes from the first end part 31a to hold the cutting insert 2.

Definition of Direction

In the present embodiment, each configuration will be described by setting an XYZ orthogonal coordinate system. An X-axis direction is a direction in which a central axis of the shank section 31 extends, that is, a direction in which the holder 3 extends, and corresponds to the axial direction (longitudinal direction) of the grooving tool 1. In the axial direction, a direction (+X side) from the second end part 31b of the shank section 31 toward the first end part 31a in which the head member 32 is disposed is referred to as a distal end side, and a direction (−X side) from the first end part 31a to the second end part 31b is referred to as a rear end side. In the present embodiment, the cutting insert 2 is held by the head member 32 in a posture in which the cutting edge 21 protrudes from a distal end part of the head member 32 to the distal end side. Therefore, the distal end side may be referred as the projection direction.

The Y-axis direction is a direction orthogonal to the X-axis direction. The Y-axis direction is a direction in which a pair of side surfaces of the shank section 31 faces, that is, a direction in which a pair of side surfaces of the holder 3 faces, and corresponds to a tool width direction (left-right direction) of the grooving tool 1. The tool width direction may also be referred as a first direction. The head member 32 is disposed in a recess part 31f formed in a first side surface 31c of the pair of side surfaces (first side surface 31c and second side surface 31d) of the shank section 31. In the tool width direction, a direction (+Y side) from the second side surface 31d of the shank section 31 toward the first side surface 31c on which the head member 32 is disposed is referred to as a right side, and a direction (−Y side) from the first side surface 31c toward the second side surface 31d is referred to as a left side. The right side may be referred as one side in the first direction. The left side may be referred as the other side in the first direction.

A Z-axis direction is a direction orthogonal to the X-axis direction and the Y-axis direction. The Z-axis direction is a direction in which a top surface and a bottom surface of the shank section 31 face, that is, a direction in which a top surface and a bottom surface of the holder 3 face, and corresponds to an vertical direction (height direction) of the grooving tool 1. The vertical direction may also be referred as a second direction. In the vertical direction, a direction in which the rake surface 22 of the cutting insert 2 faces (+Z side) is referred to as an upper side, and a direction opposite to the direction in which the rake surface 22 faces (−Z side) is referred to as a lower side. The upper side may be referred as one side in the second direction. The lower side may be referred as the other side in the second direction.

In the present embodiment, the left side, the right side, the upper side, and the lower side are simply names for describing a relative positional relationship of each portion, and a disposition relationship in a case of an actual use may be disposition other than the disposition relationship indicated by these names.

[Holder]

The shank section 31 is made of metal, such as steel. The first end part 31a of the shank section 31 has larger dimensions in the vertical direction and in the tool width direction than a portion other than the first end part 31a. The portion of the shank section 31 other than the first end part 31a has a prismatic shape extending in the axial direction.

The shank section 31 includes the recess part 31f. The recess part 31f has a recess shape sunken to the left side from the first side surface 31c facing the right side of the shank section 31. The recess part 31f is disposed in the end part of the first side surface 31c on the distal end side. The recess part 31f is a notch that is open toward the right side, the distal end side, and the upper side in the shank section 31. The recess part 31f is configured by a plurality of wall surfaces (inner wall surfaces) including at least one wall surface facing the right side.

The recess part 31f includes a mounting surface 31e. The mounting surface 31e is disposed on the wall surface facing the right side in the recess part 31f. The mounting surface 31e has a planar shape extending in a direction perpendicular to the tool width direction.

The head member 32 is made of metal. The head member 32 may be formed by casting or machining, but may also be formed by stacking metal powder materials while melting the metal powder materials using a 3D printer, for example. The head member 32 is fixed to the first end part 31a of the shank section 31, that is, the distal end part, by screwing or the like using the fixing screw 8 and the fastening screw 11.

Figure 3:
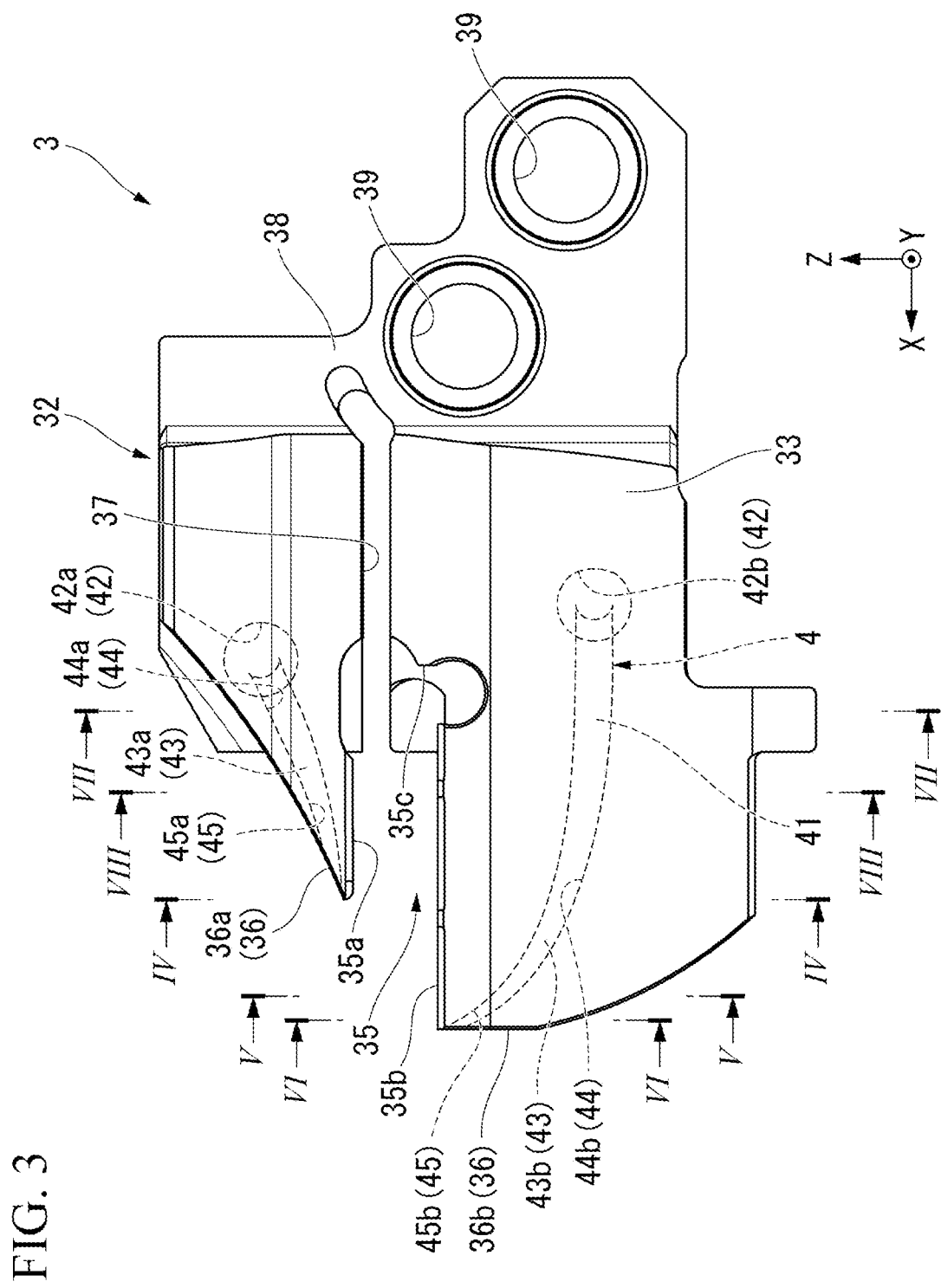
FIG. 3 is a side view of a head member of a holder according to the present embodiment as viewed from a tool width direction.
Figure 4A:
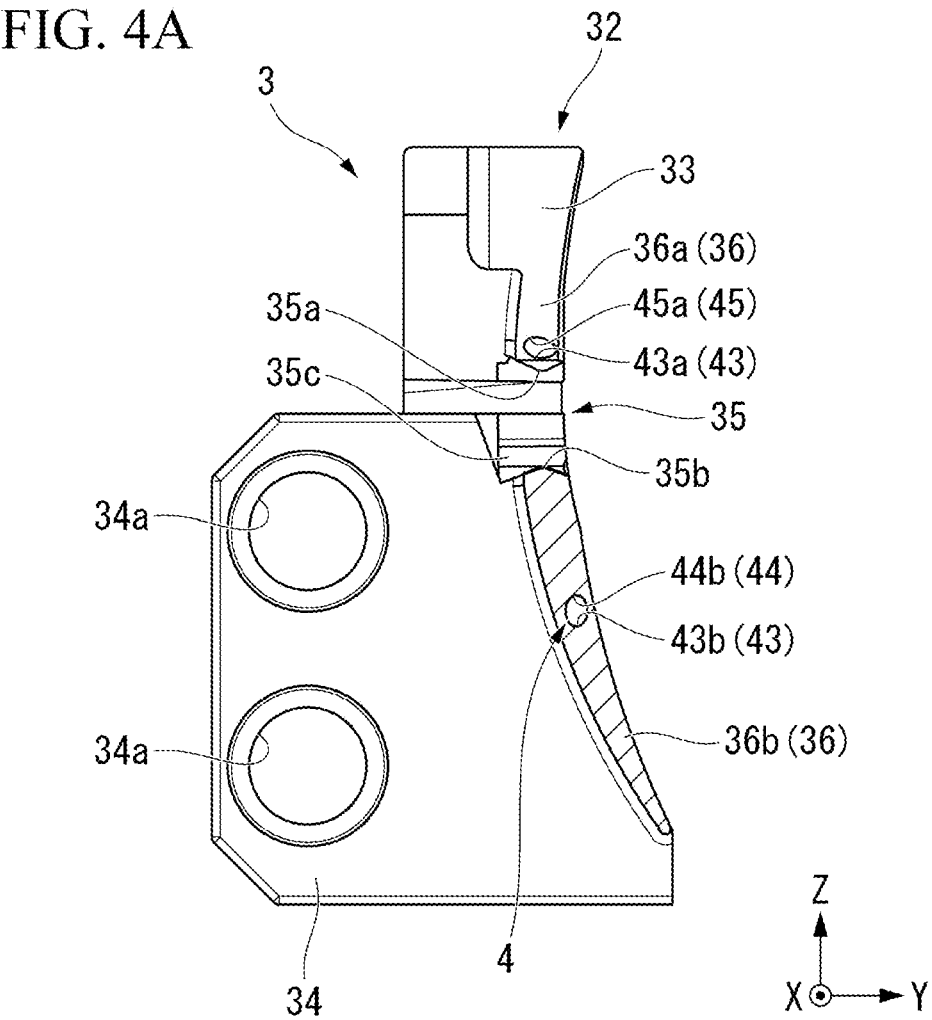
FIG. 4A is a cross-sectional view showing a IV-IV cross section in FIG. 3.
Figure 4B:
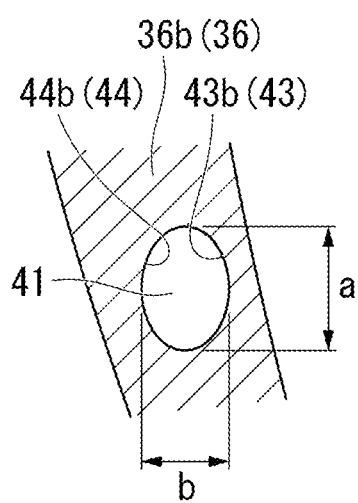
FIG. 4B is a partial cross-sectional view showing an enlarged part of FIG. 4A.

As shown in FIGS. 1 to 3, the head member 32 includes a head main body 33 having a plate shape and a head fixing plate 34 having a plate shape and extending perpendicularly to the left side from the head main body 33.

The head main body 33 as a whole forms a plate shape extending in the direction perpendicular to the tool width direction, and a part of the head main body 33 is disposed in the recess part 31f. In a pair of plate surfaces facing the tool width direction of the head main body 33, a plate surface 33a facing the left side is into contact with the mounting surface 31e of the recess part 31f.

The head main body 33 includes an insert mounting seat 35 on which the cutting insert 2 is disposed, a pair of the jaw parts 36 being into contact with the cutting insert 2 from the upper and lower directions, a slit 37 formed between the pair of jaw parts 36, a coupling portion 38 elastically coupling the pair of jaw parts 36, and a first screw insertion hole 39 for inserting a part of the fixing screw 8. In the present embodiment, the jaw parts 36 including the jaw part flow paths are provided in pairs up and down. However, in the present invention, the jaw part including the jaw part flow path need only be disposed in at least any of the upper side and the lower side of the insert mounting seat 35, and the jaw part including the jaw part flow path has a plate shape extending in the direction perpendicular to the tool width direction. The holder 3 according to the present embodiment includes the insert mounting seat 35 and the jaw part 36 for fixing the cutting insert 2 in the insert mounting seat 35.

In the present embodiment, the jaw parts 36 are provided in pairs on the upper side and the lower side of the insert mounting seat 35. In the pair of jaw parts 36, one jaw part 36 positioned on the upper side of the insert mounting seat 35 is an upper jaw part 36a, and the other jaw part 36 positioned on the lower side of the insert mounting seat 35 is a lower jaw part 36b.

The insert mounting seat 35 is positioned at a distal end side portion of the head main body 33. That is, the insert mounting seat 35 is disposed in a distal end part of the holder 3. The insert mounting seat 35 has a notch shape or a slit shape that is open to the distal end side, the left side, and the right side of the head main body 33. The cutting insert 2 is detachably attached to the insert mounting seat 35.

As shown in FIG. 3, the insert mounting seat 35 includes a pressing surface 35a that contacts an upper surface of the cutting insert 2, a base surface 35b that supports a lower surface of the cutting insert 2, and an abutment surface 35c with which a rear end of the cutting insert 2 contacts.

The pressing surface 35a is configured by a lower surface of the upper jaw part 36a. The pressing surface 35a has a cross section perpendicular to the axial direction (X-axis direction) over the entire length thereof, whose shape is a V-shape protruding toward the lower side. The pressing surface 35a is into contact with the upper surface of the cutting insert 2 and presses the cutting insert 2 from the upper side.

The base surface 35b is configured by an upper surface of the lower jaw part 36b. The base surface 35b has a cross section perpendicular to the axial direction over the entire length, whose shape is a V-shape protruding toward the upper side. The base surface 35b is into contact with the lower surface of the cutting insert 2 and supports the cutting insert 2 from the lower side.

The abutment surface 35c is disposed in a rear end of the insert mounting seat 35 and faces the distal end side. The abutment surface 35c has a planar shape substantially perpendicular to the axial direction. The abutment surface 35c is into contact with a rear end surface of the cutting insert 2 and supports the cutting insert 2 from the rear end side.

As shown in FIG. 2, the pair of jaw parts 36 forms a curved shape with a protruding left side surface and a recess right side surface as viewed from the tool distal end side, and the plate thickness is decreased as a distance from the insert mounting seat 35 is increased in the vertical direction. Specifically, the plate thickness of the upper jaw part 36a is decreased as a distance from the insert mounting seat 35 is increased to the upper side, and the plate thickness of the lower jaw part 36b is decreased as a distance from the insert mounting seat 35 is increased to the lower side. In the present embodiment, the upper jaw part 36a curves to be positioned on the right side from the insert mounting seat 35 toward the upper side, and the lower jaw part 36b curves to be positioned on the right side from the insert mounting seat 35 to the lower side.

As shown in FIG. 3, the upper jaw part 36a has a decreased dimension in the vertical direction toward the distal end side of the holder 3, and the lower jaw part 36b also has a decreased dimension in the vertical direction toward the distal end side of the holder 3. The lower jaw part 36b protrudes toward the distal end side of the holder 3 from the upper jaw part 36a. The dimension in the vertical direction of the lower jaw part 36b is larger than the dimension in the vertical direction of the upper jaw part 36a at the opposing position.

The slit 37 is disposed on the rear end side of the insert mounting seat 35 and is coupled to the insert mounting seat 35. The slit 37 extends in the axial direction of the holder 3 to divide the head main body 33 into an upper portion and a lower portion together with the insert mounting seat 35. The slit 37 has a slit shape that is open at the left side and the right side of the head main body 33.

The coupling portion 38 is disposed on a rear end side portion of the head main body 33 at a position corresponding to the termination of the slit 37, and couples the upper portion including the upper jaw part 36a and the lower portion including the lower jaw part 36b of the head main body 33. The coupling portion 38 is elastically deformable. The elastic deformation of the coupling portion 38 changes an interval in the vertical direction between the lower surface of the upper jaw part 36a and the upper surface of the lower jaw part 36b. That is, the coupling portion 38 couples the upper jaw part 36a and the lower jaw part 36b to be elastically displaceable in the vertical direction.

The first screw insertion hole 39 is disposed in the rear end side portion of the head main body 33. The first screw insertion hole 39 penetrates the head main body 33 in the tool width direction (Y-axis direction). That is, the first screw insertion hole 39 penetrates the head main body 33 in a plate thickness direction thereof. A plurality of first screw insertion holes 39 are provided, and two first screw insertion holes 39 are formed at intervals in the up-down and front-rear directions in the present embodiment.

As shown in FIG. 2, the head fixing plate 34 protrudes to the left side from a substantially central portion of the head main body 33 in the front-rear direction. The head fixing plate 34 has a plate shape extending in a direction perpendicular to the axial direction (X-axis direction). The head fixing plate 34 has a plurality of second screw insertion holes 34*a*, and two second screw insertion holes 34*a* are formed at intervals up and down in the present embodiment.

The second screw insertion hole 34*a* penetrates the head fixing plate 34 in the axial direction of the holder 3. That is, the second screw insertion hole 34*a* penetrates the head fixing plate 34 in a plate thickness direction thereof.

[Cutting Insert]

As shown in FIGS. 1 and 2, the cutting insert 2 has a shaft shape or a column shape extending in the axial direction. The cutting insert 2 according to the present embodiment has a substantially quadrangular prismatic shape. The cutting insert 2 is inserted into the insert mounting seat 35 of the head member 32 from the front and is detachably mounted. The cutting insert 2 has the rake surface 22, the flank surface 23, and the cutting edge 21.

The rake surface 22 is disposed at a front end part of the cutting insert 2 and faces the upper side. The rake surface 22 has a quadrangular shape as viewed from the upper side.

The flank surface 23 is disposed at the front end part of the cutting insert 2. The flank surface 23 has a surface facing a front end side (front flank surface), a surface facing the left side and a surface facing the right side (pair of side flank surfaces).

The cutting edge 21 is positioned on a ridgeline in which the rake surface 22 and the three flank surfaces 23 are connected to each other. The cutting edge 21 is disposed to protrude from the head main body 33 to the distal end side, the left side, and the right side.

In the present embodiment, the cutting edge 21 includes a front edge 21*a* and a pair of side edges. The front edge 21*a* extends in the tool width direction (Y-axis direction). That is, the cutting edge 21 has the cutting edge section 21*a* extending in the tool width direction. The pair of side edges is connected to both end parts of the front edge 21*a* in the tool width direction, and extends from each end part toward the rear end side. Therefore, the cutting edge 21 has a substantially U-shape as viewed from the upper surface.

The cutting insert 2 according to the present embodiment has a set of the rake surface 22, the flank surface 23, and the cutting edge 21 at both end parts in the axial direction of the cutting insert 2 in pairs.

[Fixing Screw]

The fixing screw 8 fixes the head member 32 to the distal end part of the shank section 31. A plurality of fixing screws 8 are provided. In the present embodiment, the plurality of fixing screws 8 include two first fixing screws 8*a* and two second fixing screws 8*b*.

The first fixing screw 8*a* fixes the head main body 33 to a right side surface of the shank section 31. The first fixing screw 8*a* is inserted into the first screw insertion hole 39 of the head main body 33 and screwed into a first screw hole (not shown) of the shank section 31. It is preferable that a plurality of first fixing screws 8*a* are provided.

The second fixing screw 8*b* fixes the head fixing plate 34 to a front end surface of the shank section 31. The second fixing screw 8*b* is inserted into the second screw insertion hole 34*a* of the head fixing plate 34 and screwed into a second screw hole (not shown) of the shank section 31. It is preferable that a plurality of second fixing screws 8*b* are provided.

[Fastening Screw]

The fastening screw 11 has an action of fixing the head member 32 to the upper surface of the front end part of the shank section 31 and fixing the cutting insert 2 to the insert mounting seat 35. The fastening screw 11 is screwed into a third screw hole (not shown) formed in the upper surface of the front end part of the shank section 31 in a state in which the upper portion of the head main body 33 including the upper jaw part 36*a* is pressed to the lower side. In a case in which the fastening screw 11 is fastened, the upper portion of the head main body 33 is pressed to the lower side, thereby elastically deforming the coupling portion 38 and displacing the upper jaw part 36*a* to the lower side. As a result, the cutting insert 2 disposed on the insert mounting seat 35 is clamped between the lower surface (pressing surface 35*a*) of the upper jaw part 36*a* and the upper surface (base surface 35*b*) of the lower jaw part 36*b*.

[Coolant Flow Path]

The coolant flow path 4 extends through the inside of the shank section 31 and the inside of the head member 32. Although not shown, in the coolant flow path 4, a shank section channel extending through the inside of the shank section 31 is connected to a hose or the like of coolant supply means of the machine tool. In the coolant flow path 4, a head member channel 41 extending through the inside of the head member 32 is specifically disposed inside the head main body 33. The coolant supplied from the coolant supply means flows through the inside of the coolant flow path 4.

As shown in FIGS. 1 to 3, the head member channel 41 includes a connection channel 42 connected to the shank section channel, and a jaw part flow path 43 communicating with the connection channel 42 and extending through the inside of the jaw part 36. That is, the coolant flow path 4 includes the connection channel 42 and the jaw part flow path 43.

The connection channel 42 extends in the tool width direction. The connection channels 42 are provided in pairs in the head main body 33 at intervals in the vertical direction. In the pair of connection channels 42, one connection channel 42 disposed on the upper portion of the head main body 33 is an upper connection channel 42*a*, and the other connection channel 42 disposed on the lower portion of the head main body 33 is a lower connection channel 42*b*.

The upper connection channel 42*a* has a channel cross section perpendicular to the tool width direction, which has a circular shape. The upper connection channel 42*a* is open to the upper side of the plate surface 33*a* facing the left side of the head main body 33. The upper connection channel 42*a* has an inner diameter of the channel that is decreased toward the right side from an opening portion that is open to the plate surface 33*a*. That is, a cross-sectional area of the upper connection channel 42*a* is decreased toward the right side.

The lower connection channel 42*b* has a channel cross section perpendicular to the tool width direction, which has a circular shape. The lower connection channel 42*b* is open to the lower side of the plate surface 33*a* facing the left side of the head main body 33. The lower connection channel 42*b* has an inner diameter of the channel that is decreased toward the right side from an opening portion that is open to the plate surface 33*a*. That is, a cross-sectional area of the lower connection channel 42*b* is decreased toward the right side.

The jaw part flow path 43 extends in the direction perpendicular to the tool width direction from a position connected to the connection channel 42. Specifically, the jaw part flow path 43 extends to approach the insert mounting seat 35 from the connection portion with the connection channel 42 toward the tool distal end side. In the present embodiment, the jaw part flow paths 43 are provided in pairs in the head main body 33 at intervals in the vertical direction. In the pair of jaw part flow paths 43, one jaw part flow path 43 disposed in the upper jaw part 36*a* is an upper jaw part flow path 43*a*, and the other jaw part flow path 43 disposed in the lower jaw part 36b is a lower jaw part flow path 43b. That is, the jaw part flow path 43 is provided in each jaw part 36.

As shown in FIGS. 3 to 8, the channel cross-sectional shape of the jaw part flow path 43 differs in each portion of the holder 3 in the axial direction (X-axis direction). It should be noted that, in the present specification, the "channel cross section" of the jaw part flow path 43 refers to, for example, a channel cross section appearing on a virtual plane perpendicular to the axial direction of the holder 3. The channel cross-sectional shape of the jaw part flow path 43 is gradually changed from the connection portion with the connection channel 42 toward the tool distal end side.

Specifically, the jaw part flow path 43 includes a guide flow path section 44 of which a channel cross section has a vertically elongated shape with a dimension a in the vertical direction (Z-axis direction) larger than a dimension b in the tool width direction (Y-axis direction), and an ejection flow path section 45 that communicates with the guide flow path section 44, is disposed on the tool distal end side with respect to the guide flow path section 44 and on a side closer to the insert mounting seat 35 in the vertical direction, and is open at an end part of the jaw part 36 on the tool distal end side, and of which a channel cross section has a laterally elongated shape with the dimension b in the tool width direction larger than the dimension a in the vertical direction.

Figure 5A:
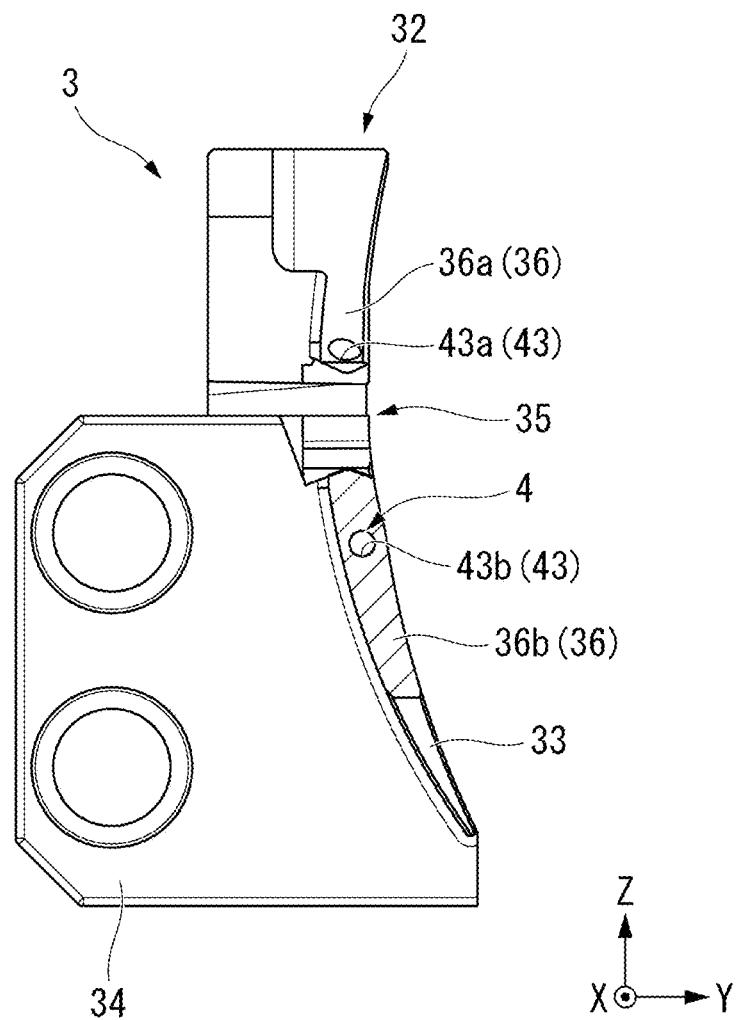
FIG. 5A is a cross-sectional view showing a V-V cross section of FIG. 3.
Figure 5B:
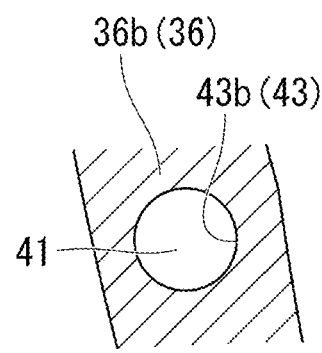
FIG. 5B is a partial cross-sectional view showing an enlarged part of FIG. 5A.
Figure 6A:
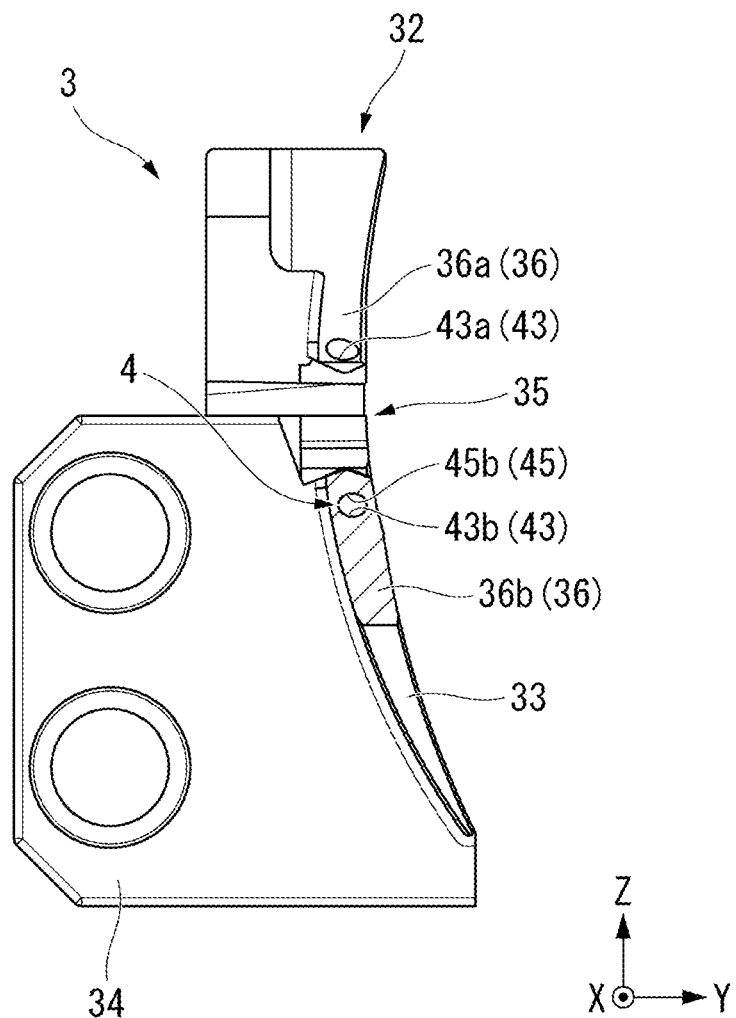
FIG. 6A is a cross-sectional view showing a VI-VI cross section of FIG. 3.
Figure 6B:
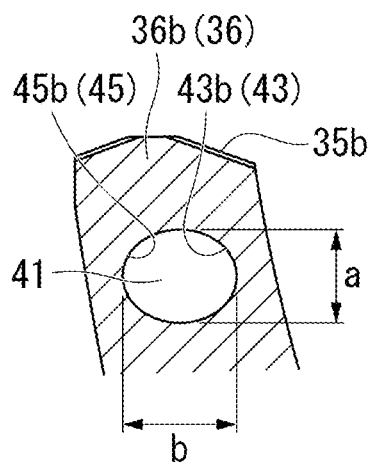
FIG. 6B is a partial cross-sectional view showing an enlarged part of FIG. 6A.
Figure 7A:
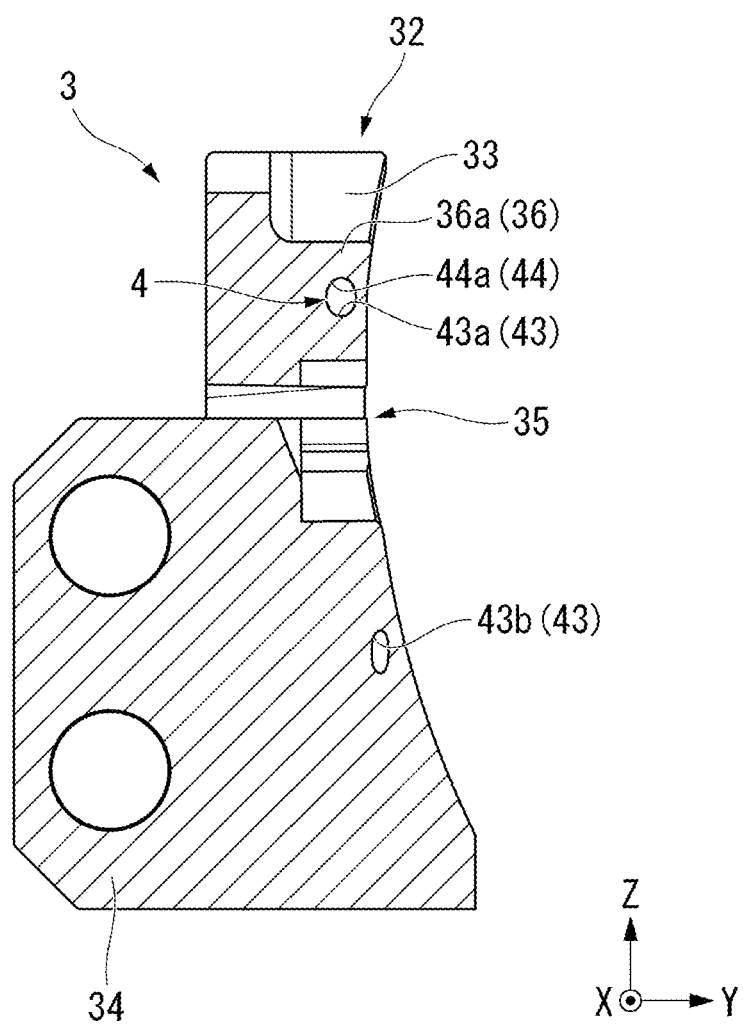
FIG. 7A is a cross-sectional view showing a VII-VII cross section of FIG. 3.
Figure 7B:
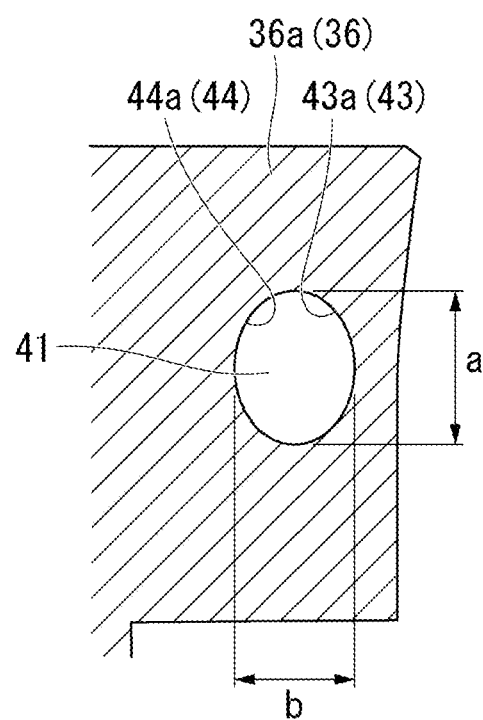
FIG. 7B is a partial cross-sectional view showing an enlarged part of FIG. 7A.
Figure 8A:
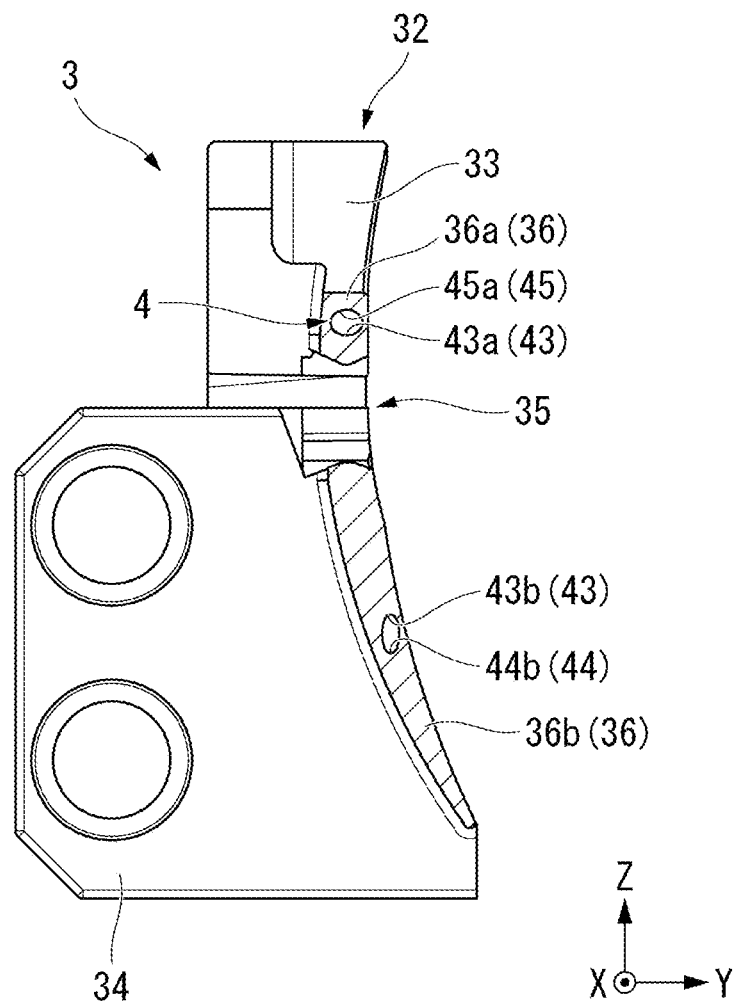
FIG. 8A is a cross-sectional view showing a VIII-VIII cross section of FIG. 3.
Figure 8B:
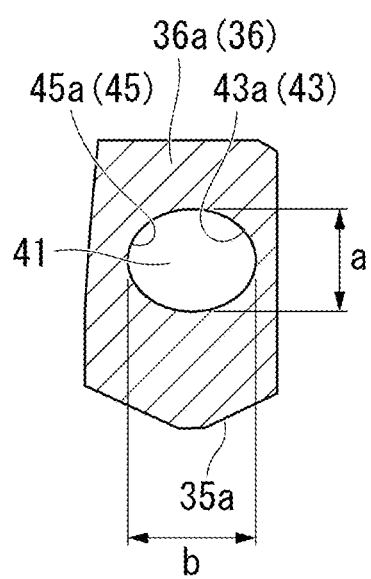
FIG. 8B is a partial cross-sectional view showing an enlarged part of FIG. 8A.
Figure 9:
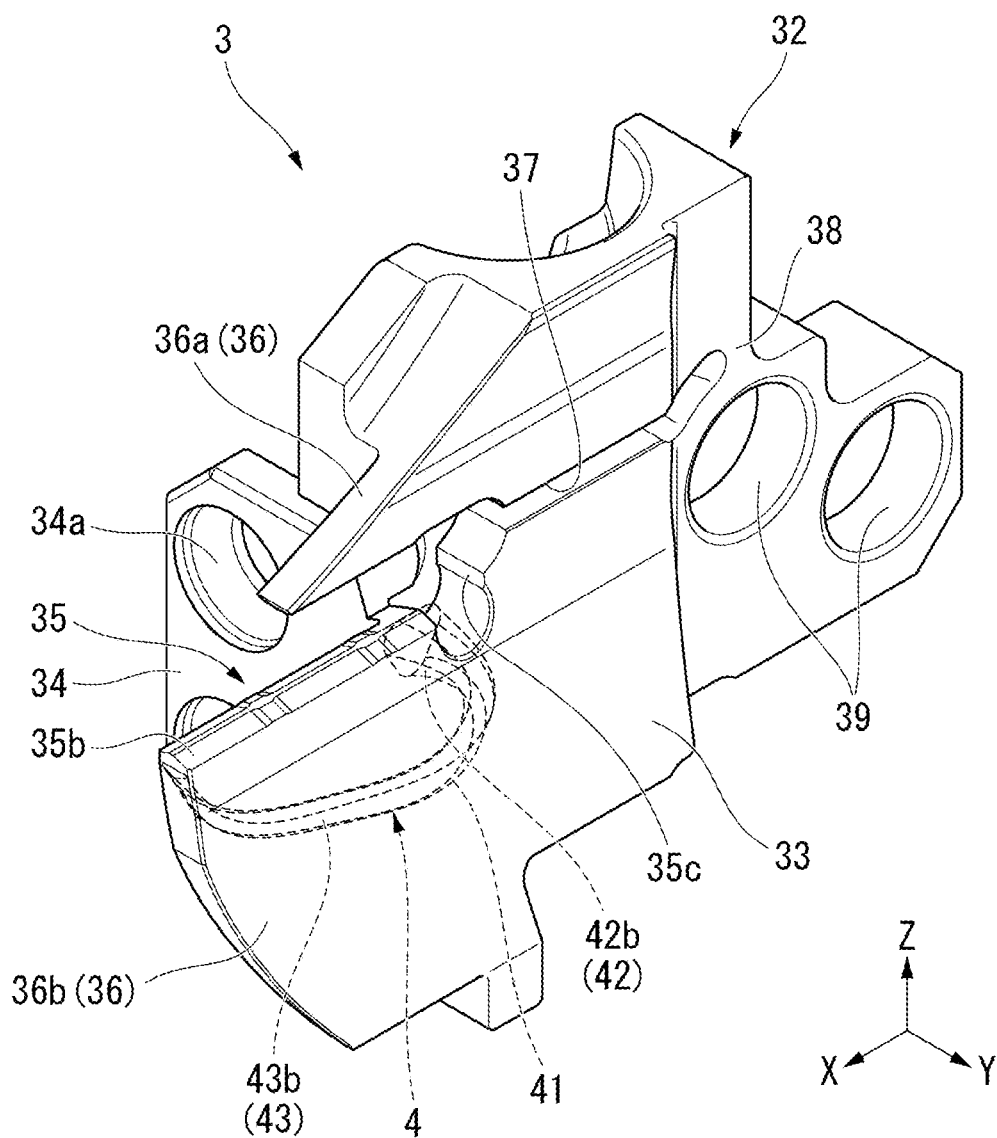
FIG. 9 is a perspective view showing a head member of a holder according to a modification example of the present embodiment.

The channel cross section of each of the guide flow path section 44 and the ejection flow path section 45 has an elliptical shape. It should be noted that, in the present embodiment, as shown in FIGS. 5A and 5B, the channel cross section at the connection portion between the guide flow path section 44 and the ejection flow path section 45 has a circular (substantially perfect circular) shape. The cross-sectional area of the guide flow path section 44 and the cross-sectional area of the ejection flow path section 45 are the same as each other, or the cross-sectional area of the ejection flow path section 45 is smaller than the cross-sectional area of the guide flow path section 44.

As shown in FIGS. 3, 4A, 4B, 7A, and 7B, the guide flow path section 44 is provided in each of the pair of jaw part flow paths 43. In the channel cross section of the guide flow path section 44, a maximum value of a ratio (a/b) of the dimension a in the vertical direction to the dimension b in the tool width direction is 1.2 or more and 5.0 or less. In the pair of guide flow path sections 44, one guide flow path section 44 provided in the upper jaw part flow path 43a is an upper guide flow path section 44a, and the other guide flow path section 44 provided in the lower jaw part flow path 43b is a lower guide flow path section 44b.

As shown in FIG. 3, the upper guide flow path section 44a extends toward the lower side from the connection portion with the upper connection channel 42a toward the tool distal end side. In the channel cross section of the upper guide flow path section 44a, the ratio (a/b) of the dimension a in the vertical direction to the dimension b in the tool width direction is decreased toward the tool distal end side.

The lower guide flow path section 44b extends to the upper side from the connection portion with the lower connection channel 42b toward the tool distal end side. In the channel cross section of the lower guide flow path section 44b, the ratio (a/b) of the dimension a in the vertical direction to the dimension b in the tool width direction is decreased toward the tool distal end side.

As shown in FIGS. 3, 6A, 6B, 8A, and 8B, the ejection flow path section 45 is provided in each of the pair of jaw part flow paths 43. In the channel cross section of the ejection flow path section 45, a maximum value of a ratio (b/a) of the dimension b in the tool width direction to the dimension a in the vertical direction is 1.2 or more and 5.0 or less. In the pair of ejection flow path sections 45, one ejection flow path section 45 provided in the upper jaw part flow path 43a is an upper ejection flow path section 45a, and the other ejection flow path section 45 provided in the lower jaw part flow path 43b is a lower ejection flow path section 45b.

As shown in FIG. 3, the upper ejection flow path section 45a extends to the lower side from the connection portion with the upper guide flow path section 44a toward the tool distal end side. In the channel cross section of the upper ejection flow path section 45a, the ratio (b/a) of the dimension b in the tool width direction to the dimension a in the vertical direction is increased toward the tool distal end side. A distal end part of the upper ejection flow path section 45a is open to a surface facing the distal end side of the upper jaw part 36a. The distal end part, that is, an opening portion (upper ejection port) of the upper ejection flow path section 45a is disposed adjacent to the upper side of the insert mounting seat 35. The opening portion of the upper ejection flow path section 45a is open toward the rake surface 22 and the cutting edge 21 of the cutting insert 2.

The lower ejection flow path section 45b extends to the upper side from the connection portion with the lower guide flow path section 44b toward the tool distal end side. In the channel cross section of the lower ejection flow path section 45b, the ratio (b/a) of the dimension b in the tool width direction to the dimension a in the vertical direction is increased toward the tool distal end side. A distal end part of the lower ejection flow path section 45b is open to a surface facing the distal end side of the lower jaw part 36b. The distal end part of the lower ejection flow path section 45b, that is, an opening portion (lower ejection port) is disposed adjacent to the lower side of the insert mounting seat 35. The opening portion of the lower ejection flow path section 45b is open toward the flank surface 23 and the cutting edge 21 of the cutting insert 2.

Actions and Effects of Present Embodiment

With the grooving tool 1 according to the present embodiment described above, even in a case in which the jaw part 36 that clamps the cutting insert 2 has a curved plate shape with the plate thickness that is decreased as a distance from the insert mounting seat 35 is increased in the vertical direction, the coolant can be stably ejected with high accuracy from the jaw part flow path 43 extending through the inside of the jaw part 36 to the vicinity of the cutting edge 21.

More specifically, since the channel cross section of the ejection flow path section 45 that is open to the end part of the jaw part 36 on the tool distal end side in the jaw part flow path 43 has a laterally elongated shape with the dimension b in the tool width direction larger than the dimension a in the vertical direction, the ejection flow path section 45 is disposed in the large-plate thickness portion in the jaw part 36, that is, a portion close to the insert mounting seat 35, and the coolant can be stably ejected over the entire area from the ejection flow path section 45 to the entire cutting edge 21 including at least the cutting edge section 21a.

In addition, since the channel cross section of the guide flow path section 44 in the jaw part flow path 43 has the vertically elongated shape with the dimension a in the vertical direction larger than the dimension b in the tool width direction, the guide flow path section 44 can be disposed in the small-plate thickness portion (thin-wall portion) that is distant from the insert mounting seat 35 in the vertical direction in the jaw part 36. That is, the guide flow path section 44 can be disposed in the thin-wall portion of the jaw part 36 in a state of ensuring a large cross-sectional area of the guide flow path section 44, that is, a state of ensuring the flow rate of the coolant ejected from the jaw part 36, it is easy to incline a shape of the channel from the guide flow path section 44 to the ejection flow path section 45 with an angle to the vertical direction toward the tool distal end side. Therefore, it is easy to dispose the cutting edge 21 in the vicinity of the extension line of the opening portion (ejection port) of the ejection flow path section 45, and the coolant can be supplied to the vicinity of the cutting edge 21 with high accuracy and high efficiency.

Further, in the present embodiment, the jaw parts 36 are provided in pairs on the upper side and the lower side of the insert mounting seat 35, and the jaw part flow path 43 is provided in each of the jaw parts 36.

In this case, the coolant can be ejected from the jaw part flow path 43 (upper jaw part flow path 43*a*) of the upper jaw part 36*a*, of the pair of jaw parts 36, which is disposed on the upper side of the insert mounting seat 35 to the vicinity of the cutting edge 21 through the rake surface 22 of the cutting insert 2. In addition, the coolant can be ejected from the jaw part flow path 43 (lower jaw part flow path 43*b*) of the lower jaw part 36*b*, of the pair of jaw parts 36, which is disposed on the lower side of the insert mounting seat 35 to the vicinity of the cutting edge 21 through the flank surface 23 of the cutting insert 2. Therefore, it is possible to more stably supply the coolant to the vicinity of the cutting edge 21.

In addition, in the present embodiment, the cross-sectional area of the ejection flow path section 45 is smaller than the cross-sectional area of the guide flow path section 44, or the cross-sectional area of the guide flow path section 44 and the cross-sectional area of the ejection flow path section 45 are the same as each other.

For example, unlike the present embodiment described above, in a case in which the cross-sectional area of the ejection flow path section 45 is larger than the cross-sectional area of the guide flow path section 44, when the coolant flows from the guide flow path section 44 to the ejection flow path section 45, a decrease in the flow velocity, a pressure loss, or the like may occur due to an increase in the cross-sectional area.

On the other hand, according to the present embodiment, when the coolant flows from the guide flow path section 44 to the ejection flow path section 45, the decrease in the flow velocity, the pressure loss, or the like is suppressed. The flow velocity of the coolant flowing in the ejection flow path section 45 is stably increased, and the vicinity of the cutting edge 21 can be cooled with high efficiency by the coolant ejected from the ejection flow path section 45.

In addition, in the present embodiment, in the channel cross section of the guide flow path section 44, the ratio (a/b) of the dimension a in the vertical direction to the dimension b in the tool width direction is 1.2 or more and 5.0 or less.

In a case in which the ratio (a/b) is 1.2 or more, the channel cross section of the guide flow path section 44 is stably formed into a vertically elongated shape, and it is easy to dispose the guide flow path section 44 in the thin-wall portion of the jaw part 36. Therefore, the actions and effects of the present embodiment described above can be obtained more stably. In a case in which the ratio (a/b) is 5.0 or less, it is possible to suppress problems, such as the increase in the pressure loss due to the shape of the channel cross section being too long and flat.

In addition, in the present embodiment, in the channel cross section of the ejection flow path section 45, the ratio (b/a) of the dimension b in the tool width direction to the dimension a in the vertical direction is 1.2 or more and 5.0 or less.

In a case in which the ratio (b/a) is 1.2 or more, the channel cross section of the ejection flow path section 45 is stably formed into a laterally elongated shape, and it is easy to eject the coolant stably to the entire area of the cutting edge 21 from the ejection flow path section 45. Therefore, the actions and effects of the present embodiment described above can be obtained more stably. In a case in which the ratio (b/a) is 5.0 or less, it is possible to suppress problems that the coolant is wastefully diffused to a portion other than the cutting edge 21 due to the coolant being ejected in a form of mist due to the shape of the channel cross section being too long and flat.

[Other Configurations Included in Present Invention]

The present invention is not limited to the embodiment described above, and for example, as described below, the change or the like of the configuration can be made without departing from the gist of the present invention.

In the embodiment described above, the example has been described in which the channel cross section of each of the guide flow path section 44 and the ejection flow path section 45 has an elliptical shape, but the present invention is not limited to this.

FIGS. 9 to 13 show modification examples of the head member 32 of the grooving tool 1 described in the embodiment described above. In the modification example, the channel cross section of each of the guide flow path section 44 and the ejection flow path section 45 has a polygonal shape. In the shown example, the channel cross section of each of the guide flow path section 44 and the ejection flow path section 45 has a triangular shape. In addition to a triangular shape, a quadrangular shape (rhombus shape), a pentagonal shape, a hexagonal shape, or the like may be used. In the modification example, as shown in FIGS. 12A and 12B, the channel cross section at the connection portion between the guide flow path section 44 and the ejection flow path section 45 has an equilateral triangular shape.

Figure 11A:
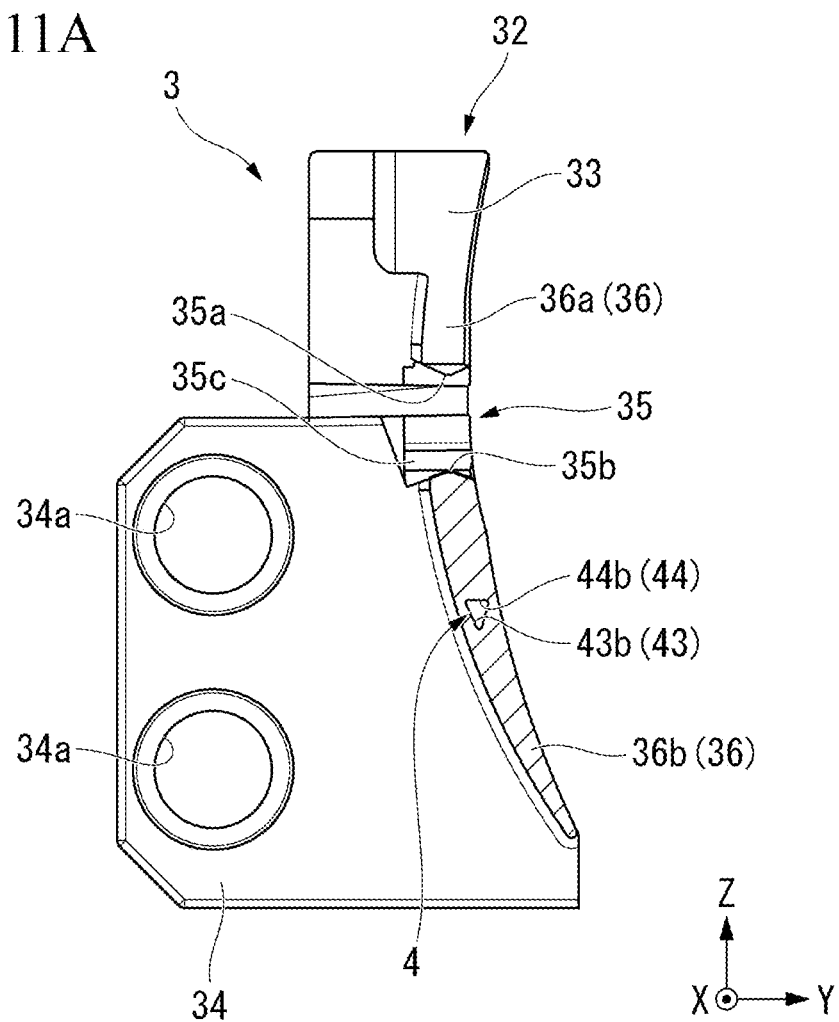
FIG. 11A is a cross-sectional view showing a XI-XI cross section of FIG. 10.
Figure 11B:
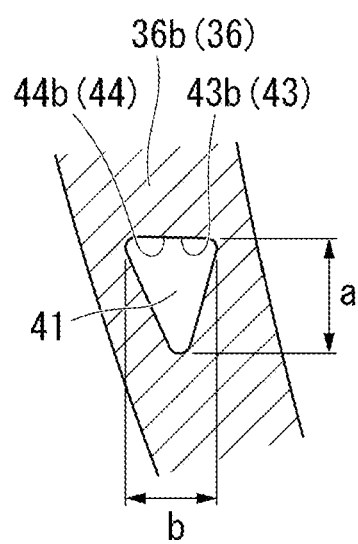
FIG. 11B is a partial cross-sectional view showing an enlarged part of FIG. 11A.
Figure 12A:
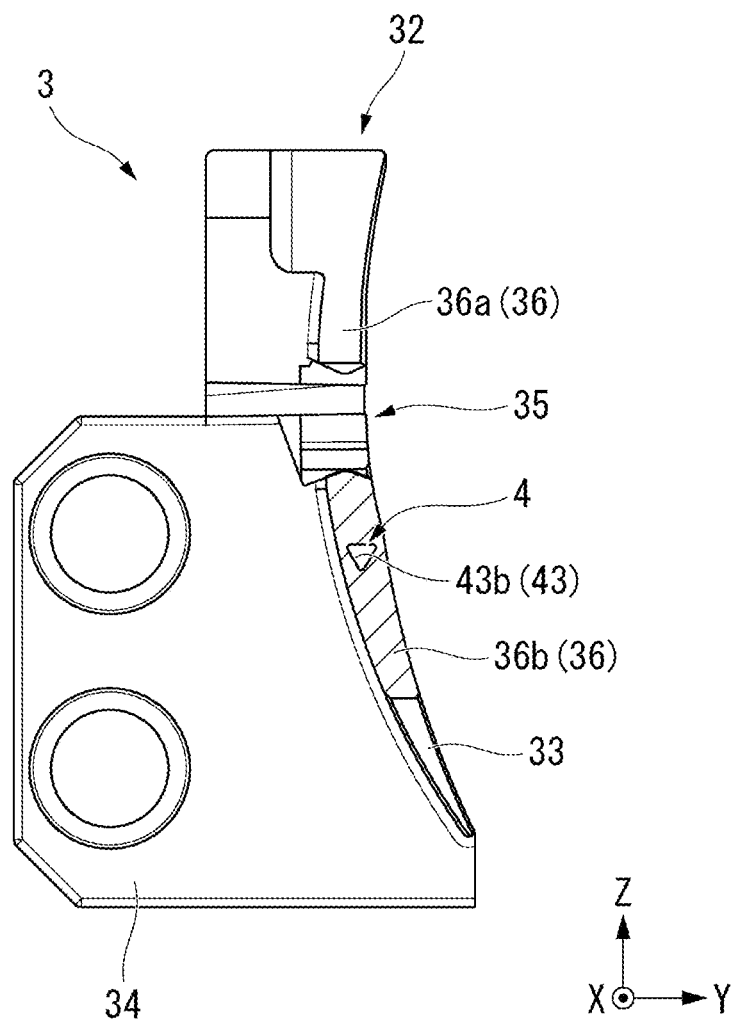
FIG. 12A is a cross-sectional view showing a XII-XII cross section of FIG. 10.
Figure 12B:
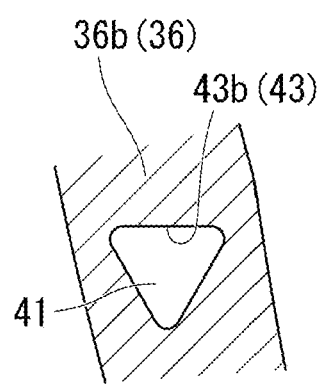
FIG. 12B is a partial cross-sectional view showing an enlarged part of FIG. 12A.

As shown in FIGS. 11A and 11B, in the channel cross section of the guide flow path section 44, the ratio (a/b) of the dimension a in the vertical direction to the dimension b in the tool width direction of 1.2 or more and 5.0 or less.

Figure 13A:
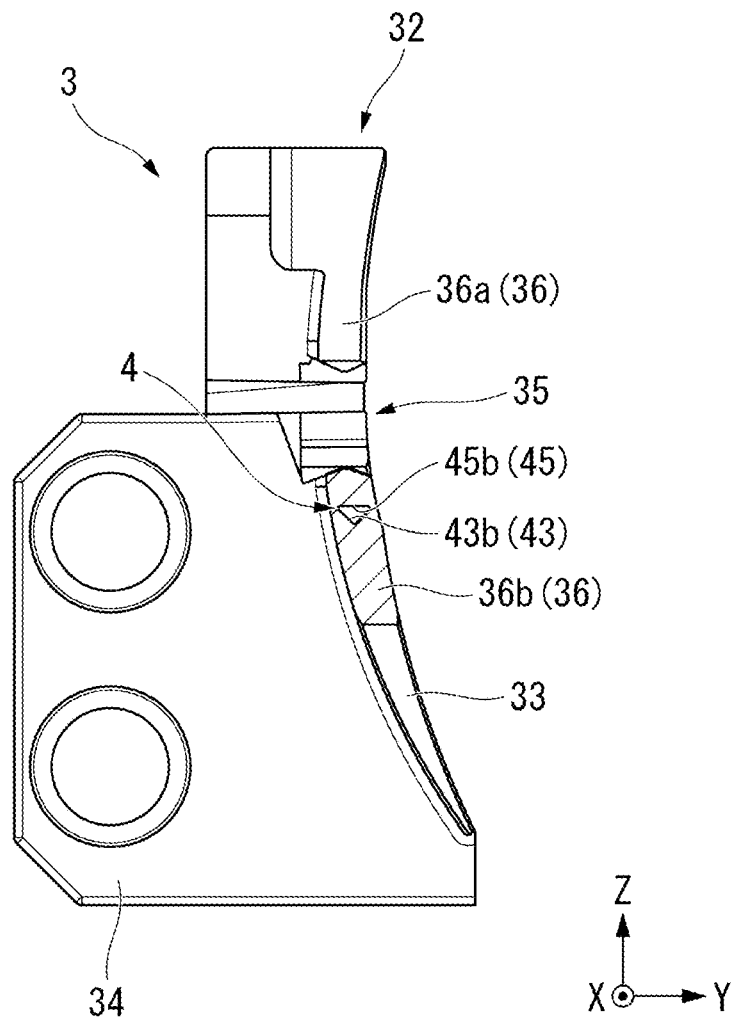
FIG. 13A is a cross-sectional view showing a XIII-XIII cross section of FIG. 10.
Figure 13B:
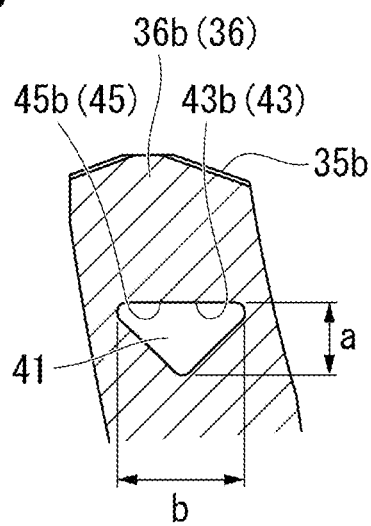
FIG. 13B is a partial cross-sectional view showing an enlarged part of FIG. 13A.

As shown in FIGS. 13A and 13B, in the channel cross section of the ejection flow path section 45, the ratio (b/a) of the dimension b in the tool width direction to the dimension a in the vertical direction is 1.2 or more and 5.0 or less.

Figure 10:
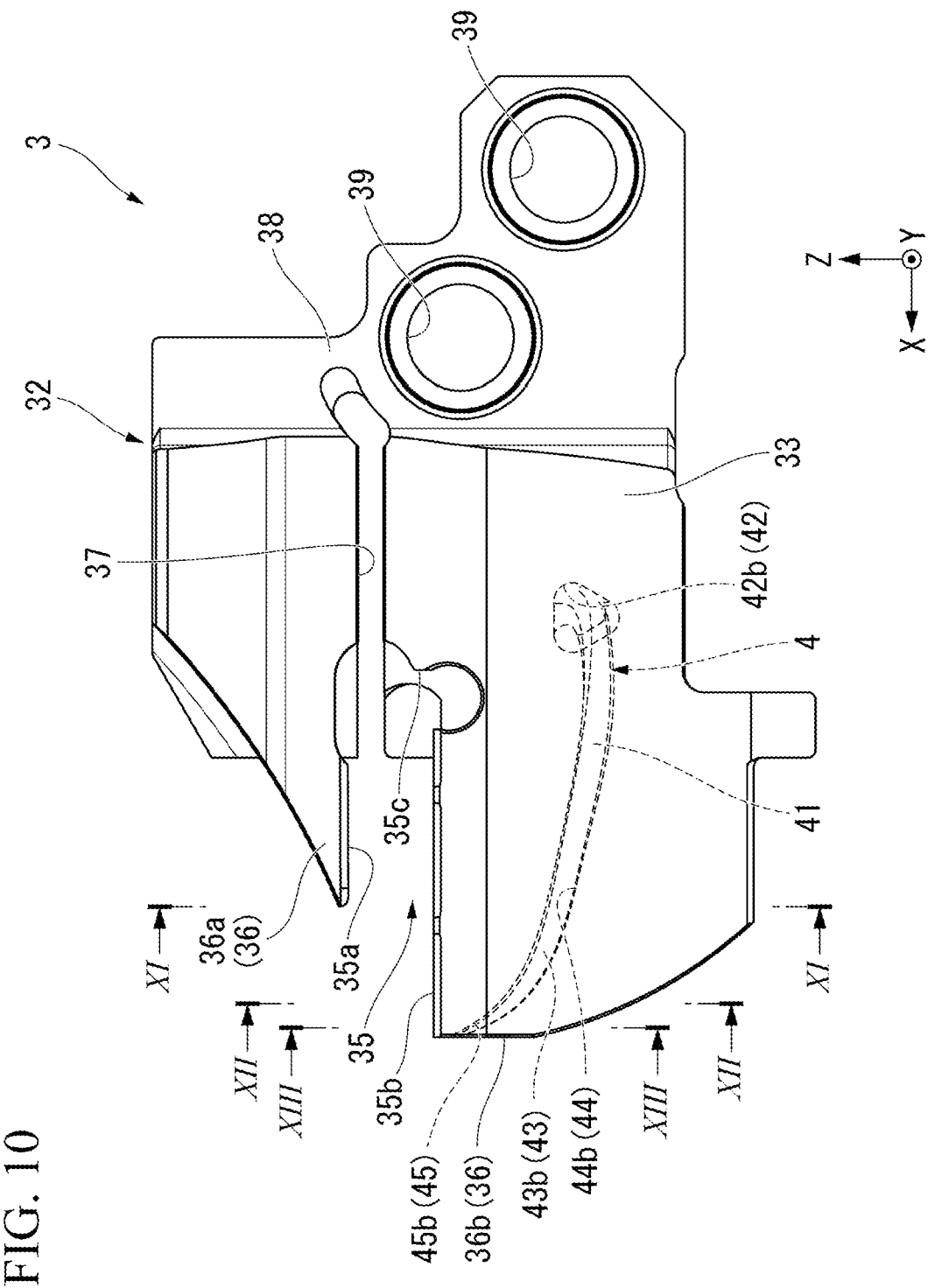
FIG. 10 is a side view of the head member of the holder of the modification example of the present embodiment as viewed from a tool width direction.

As shown in FIG. 10, the connection channel 42 has the channel cross section perpendicular to the tool width direction, which has a polygonal shape, specifically a triangular shape.

Also in the modification example, the same actions and effects as in the embodiment described above can be obtained. It should be noted that, as shown in the modification example, only one set of the connection channel 42 of the coolant flow path 4 and the jaw part flow path 43 may be provided in the head member 32.

In addition, in the embodiment described above, the example has been described in which, as viewed from the tool distal end side, the upper jaw part 36*a* curves to be positioned on the right side (+Y side) from the insert mounting seat 35 toward the upper side (+Z side), and the lower jaw part 36*b* curves to be positioned on the right side from the insert mounting seat 35 toward the lower side (−Z side), but the present invention is not limited to this.

Although not shown in particular, as viewed from the tool distal end side, the upper jaw part 36*a* may curve to be positioned on the left side (−Y side) from the insert mounting seat 35 toward the upper side, and the lower jaw part 36*b* may curve to be positioned on the left side from the insert mounting seat 35 toward the lower side.

Further, in the embodiment described above, the example has been described in which the jaw parts 36 having the jaw part flow path are provided in pairs on the upper side and the lower side of the insert mounting seat 35, but the present invention is not limited to this. Only one jaw part including the jaw part flow path may be provided on the upper side or the lower side of the insert mounting seat 35. In this case, the cutting insert 2 is clamped between the jaw part not including the jaw part flow path and the jaw part including the jaw part flow path and fixed to the insert mounting seat.

It should be noted that, although not shown, the jaw part not including the jaw part flow path may be formed separately from the head member 32. In this case, the jaw part not including the jaw part flow path may be configured by a clamping member that can clamp the cutting insert 2 by approaching the jaw part including the jaw part flow path by sliding movement or the like.

The present invention may combine the configurations described in the embodiment described above and the modification examples without departing from the gist of the present invention, and the addition, the omission, the replacement, and other changes of the configuration can be made. Moreover, the present invention is not limited by the embodiment described above and the like, but is limited only by the scope of the claims.

INDUSTRIAL APPLICABILITY

With the grooving tool according to the present invention, the coolant can be ejected with high accuracy to the vicinity of the cutting edge while ensuring the coolant flow rate.

Therefore, the industrial applicability is achieved.

REFERENCE SIGNS LIST

1: Grooving tool
2: Cutting insert
3: Holder
4: Coolant flow path
21: Cutting edge
21*a*: Front edge (cutting edge section)
35: Insert mounting seat
36: Jaw part
43: Jaw part flow path
44: Guide flow path section
45: Ejection flow path section
a: Dimension in vertical direction in channel cross section
b: Dimension in tool width direction in channel cross section

What is claimed is:

1. A grooving tool comprising:
a cutting insert including a cutting edge;
a holder configured to hold the cutting insert; and
a coolant flow path extending through an inside of the holder,
wherein the cutting edge includes a cutting edge section extending in a tool width direction,
the holder includes an insert mounting seat on which the cutting insert is disposed, and a pair of jaw parts disposed on an upper side and a lower side of the insert mounting seat and contact with the cutting insert from upper and lower directions,
at least one of the jaw parts has a plate shape extending in a direction perpendicular to the tool width direction, forms a curved shape as viewed from a tool distal end side, and has a plate thickness that is decreased as a distance from the insert mounting seat is increased in the upper or lower direction,
the coolant flow path includes a jaw part flow path extending through an inside of the at least one of the jaw parts,
the jaw part flow path includes:
a guide flow path section, and
an ejection flow path section that communicates with the guide flow path section, is disposed on the tool distal end side with respect to the guide flow path section and on a side closer to the insert mounting seat in the vertical direction, and is open at an end part of the jaw part on the tool distal end side,
a channel cross section of the guide flow path section has a vertically elongated shape with a dimension in the vertical direction larger than a dimension in the tool width direction, and
a channel cross section of the ejection flow path section has a laterally elongated shape with a dimension in the tool width direction larger than a dimension in the vertical direction.

2. The grooving tool according to claim 1, wherein the jaw part flow path is provided in each of the jaw parts.

3. The grooving tool according to claim 1, wherein a cross-sectional area of the ejection flow path section is smaller than a cross-sectional area of the guide flow path section.

4. The grooving tool according to claim 1, wherein a cross-sectional area of the guide flow path section and a cross-sectional area of the ejection flow path section are the same as each other.

5. The grooving tool according to claim 1, wherein a maximum value of a ratio a/b of a dimension a in the vertical direction to a dimension b in the tool width direction in the channel cross section of the guide flow path section is 1.2 or more and 5.0 or less, and the ratio a/b of the guide flow path section is decreased toward the tool distal end side.

6. The grooving tool according to claim 1, wherein a maximum value of a ratio b/a of a dimension b in the tool width direction to a dimension a in the vertical direction in the channel cross section of the ejection flow path section is 1.2 or more and 5.0 or less, and the ratio b/a of the ejection flow path section is increased toward the tool distal end side.

7. The grooving tool according to claim 1, wherein the channel cross section of each of the guide flow path section and the ejection flow path section has an elliptical shape.

8. The grooving tool according to claim 1, wherein the channel cross section of each of the guide flow path section and the ejection flow path section has a polygonal shape.

* * * * *